United States Patent
Lampinen (10) Patent No.: US 7,528,588 B2
(45) Date of Patent: May 5, 2009

(54) METHOD AND CIRCUIT FOR LIMITING OUTPUT VOLTAGE IN A SWITCHED-MODE POWER SUPPLY AND A SWITCHED-MODE POWER SUPPLY

(75) Inventor: Pertti Lampinen, Halikko (FI)

(73) Assignee: Salcomp Oyj, Salo (FI)

( * ) Notice: Subject to any disclaimer, the term of this patent is extended or adjusted under 35 U.S.C. 154(b) by 25 days.

(21) Appl. No.: 11/630,538

(22) PCT Filed: Jun. 23, 2004

(86) PCT No.: PCT/FI2004/000380

§ 371 (c)(1),
(2), (4) Date: Dec. 21, 2006

(87) PCT Pub. No.: WO2006/000610

PCT Pub. Date: Jan. 5, 2006

(65) Prior Publication Data

US 2008/0024095 A1    Jan. 31, 2008

(51) Int. Cl.
*G05F 1/00* (2006.01)
*G05F 3/16* (2006.01)
*H02M 1/00* (2007.01)
*H02M 3/24* (2006.01)
*H02M 7/00* (2006.01)
*H02M 7/537* (2006.01)

(52) U.S. Cl. ............... 323/282; 323/224; 323/266; 323/271; 363/131; 363/49; 363/95; 363/97; 363/116

(58) Field of Classification Search .......... 363/116, 363/97, 21, 49, 95, 131; 323/224, 271, 266, 323/282

See application file for complete search history.

(56) References Cited

U.S. PATENT DOCUMENTS

| | | | | | |
|---|---|---|---|---|---|
| 3,660,672 | A | * | 5/1972 | Berger et al. | 323/285 |
| 4,763,235 | A | * | 8/1988 | Morita | 363/19 |
| 4,942,508 | A | * | 7/1990 | Nakamura | 323/289 |
| 5,402,059 | A | * | 3/1995 | Bittar | 323/223 |
| 5,675,485 | A | * | 10/1997 | Seong | 363/97 |
| 5,949,223 | A | * | 9/1999 | Mine | 323/224 |
| 6,038,143 | A | * | 3/2000 | Miyazaki et al. | 363/19 |
| 6,608,471 | B2 | * | 8/2003 | Balakrishnan et al. | 323/283 |

FOREIGN PATENT DOCUMENTS

EP    0853371    7/1998

* cited by examiner

*Primary Examiner*—Akm E Ullah
*Assistant Examiner*—Jue Zhang
(74) *Attorney, Agent, or Firm*—Ware, Fressola, Van Der Sluys & Adolphson LLP (57) ABSTRACT

A switched-mode power supply (200, 300, 400) comprises a primary side, a secondary side and a transformer (103, 303, 403) therebetween. An output on the secondary side delivers an output voltage and an output current to a load. An output voltage control circuit (110, 113, 801) keeps the output voltage at a first level, corresponding to a first output current value. A circuit element (201, 301, 401) integrates over time a voltage obtained from the transformer (103, 303, 403) and produces a signal indicative of the integrated voltage, corresponding to a second output current value that is smaller than the first output current value. An output voltage modifier (113, 601, 801) responds to the signal by changing the output voltage from the first level to a second level.

12 Claims, 6 Drawing Sheets

METHOD AND CIRCUIT FOR LIMITING OUTPUT VOLTAGE IN A SWITCHED-MODE POWER SUPPLY AND A SWITCHED-MODE POWER SUPPLY

CROSS REFERENCE TO RELATED APPLICATIONS

This application is for entry into the U.S. national phase under §371 for International Application No. PCT/FI04/000380 having an international filing date of Jun. 23, 2004, and from which priority is claimed under all applicable sections of Title 35 of the United States Code.

TECHNICAL FIELD

The invention concerns generally the technology of control methods and control couplings internal to switched-mode power supplies. Especially the invention concerns controlling the output voltage of a switched-mode power supply at low output current values.

BACKGROUND OF THE INVENTION

A switched-mode power supply must include inherent controlling functionalities that ensure controlled operation even in exceptional situations. Thinking about a battery charger for example, it is most certain that situations will occur where the input power is on, but there is no load coupled to the charger. Without control measures with some kind of limiting effects, continuously pumping electric power to the secondary side would cause the output voltage to rise above the nominal output voltage level. A short circuit at the output, on the other hand, could easily cause the output current to achieve unacceptably high values.

Figure 1A:
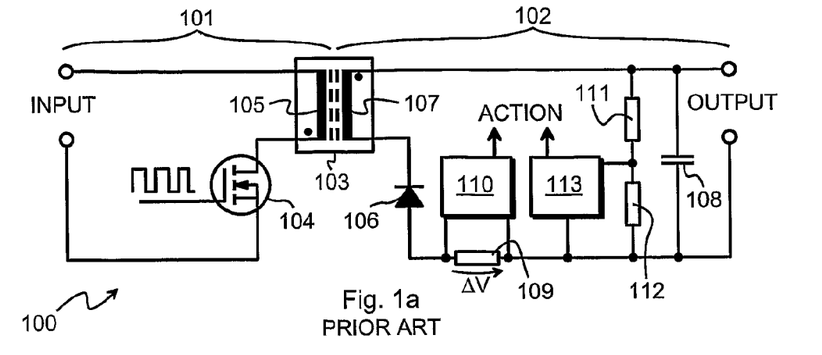
FIG. 1a illustrates a prior art switched-mode power supply.
Figure 1B:
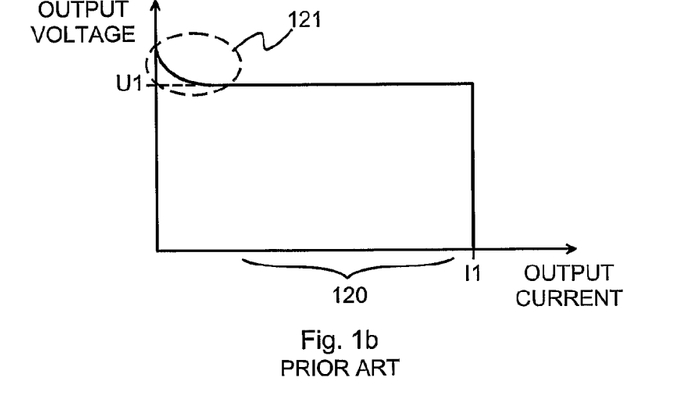
FIG. 1b is a schematic output voltage per output current diagram of the switched-mode power supply of FIG. 1a, FIG. 2 illustrates a circuit principle according to an embodiment of the invention.

A very commonly used approach for limiting output voltage and output current is illustrated schematically in FIGS. 1a and 1b. A switched-mode power supply 100 comprises a primary side 101 and a secondary side 102 separated from each other by a transformer 103. A switch 104 on the primary side repeatedly switches the current flowing through a primary coil 105, which causes energy to be stored into the magnetic field of the transformer 103. A diode 106 on the secondary side only allows current to flow in one direction through a secondary coil 107. A capacitor 108 coupled across the output of the device smoothens the output voltage.

In order to monitor the output current that flows out of the switched-mode power supply, there is a small resistor 109 coupled in series with the diode 106 and the secondary coil 107. When a normal load is coupled to the output, a current of some reasonable level flows through the resistor 109 causing a voltage drop $\Delta V$. A monitoring circuit 110 is arranged to measure the value of $\Delta V$ and to trigger some limiting action if the measured value is too high, which would indicate a short circuit at the output. As a response to an output given by the monitoring circuit 110, typically a control entity somewhere in the switched-mode power supply limits the amount of electric energy that is pumped to the transformer.

The switched-mode power supply of FIG. 1a is also adapted to monitor the output voltage. The secondary side 103 includes a series coupling of two relatively large resistors 111 and 112 coupled across the output voltage. These resistors constitute a voltage divider. A monitoring circuit 113 monitors the voltage across one of the resistors 111 and 112 (here resistor 112), which is directly proportional to the output voltage. The monitoring circuit 113 is adapted to trigger limiting action if the voltage drop across resistor 112 rises higher than a predetermined limit, which would indicate an overvoltage situation at the output.

FIG. 1b is an output voltage per output current diagram that illustrates graphically the controlling effects of the monitoring circuits 110 and 113. During normal operation, when the output current has some value in the range approximately designated as 120, the output voltage monitoring circuit 113 is active and keeps the output voltage at some predetermined level U1. If the output current tries to grow larger than a limiting value I1, the output current monitoring circuit 110 steps in to keep the output current from rising any higher.

At the leftmost part of the graph in FIG. 1b there is an area 121 that may involve some uncertainty in the operation of the switched-mode power supply. For example when a battery is almost full, it will only draw a very small current from the switched-mode power supply of a charger. In general, this tends to cause the output voltage to rise. When there is no load at all, there will be no actual output current but only some small leakage currents that together with the continuous pumping of energy from the primary cause the output voltage to assume some value, which is typically higher than U1. This may lead to harmful effects, such as unnecessarily warming up the switched-mode power supply. Additionally "overstuffing" the secondary side with electric energy when there is no load means that at the very moment when a load is connected, there will be a rushing, potentially excessively high initial current to the load before any controlling circuitry comes effective again.

SUMMARY OF THE INVENTION

It is an objective of the present invention to present a method and a circuit for controlling the output voltage of a switched-mode power supply at small output currents. Another objective of the invention is to present a method and a circuit of the above-mentioned kind that allow a circuit designer to select, exactly what kind of behaviour should the output characteristics of a particular switched-mode power supply exhibit. A yet other objective of the invention is to present a switched-mode power supply implementing said method and including said circuit.

The objectives of the invention are achieved by equipping the switched-mode power supply with a specific monitoring circuit that overrides the controlling effect of other monitoring circuitry at low output current values and forces, when active, the output characteristics of the switched-mode power supply to adhere to certain controlled behaviour.

The irregularities that have been observed in the behaviour of state of the art switched mode power supplies appear to result at least partly from the fact that the monitoring circuitry, which has been dimensioned for optimal operation under normal working conditions, runs out of dynamic range or otherwise fails to provide the fine resolution that would be needed to measure and react to the small signals available in situations that involve a very small output current. According to the invention there is provided a specific measurement circuit, which has a negligible effect on the operation of the switched-mode power supply as long as output current is large enough to belong to a certain normal range, but overrides or augments the normal mode monitoring and controlling arrangements when the output current becomes very small.

In order to achieve the required fine resolution and responding capability to small signals, the specific measurement circuit preferably collects information during a time that is considerably longer than a switching cycle of the main switch in the switched-mode power supply. In an exemplary embodiment the specific measurement circuit integrates the secondary voltage (or some other voltage that changes over time but is proportional to the secondary voltage) with a time constant in the order of some thousand times longer than said switching cycle.

Since the specific measurement circuit will be deliberately designed to only implement a certain functionality at very low output current values, there will be considerable freedom to decide, what should be the actual effect of said specific measurement circuit stepping in. This allows applying the invention to implement a certain advanced feature of power supplies. Namely, a sufficiently intelligent device that is coupled as a load to a power supply may measure the response of the power supply to various load current values and use the measured response to identify, what brand and type of a power supply it is coupled to, and even to either accept or reject its battery being charged with that power supply.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DETAILED DESCRIPTION

FIGS. 1a and 1b have been described in detail in the description of prior art, so the following discussion will focus on FIGS. 2 to 16.

Figure 2:
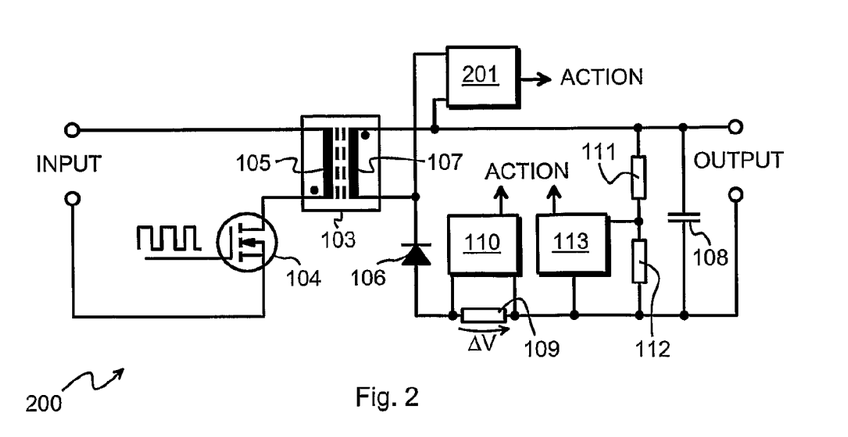

The switched-mode power supply 200 of FIG. 2 is mostly similar to that shown in FIG. 1a, with like parts being designated with the same reference designators. As a difference to FIG. 1a, the switched-mode power supply 200 of FIG. 2 comprises an additional circuit element 201 coupled to the poles of the secondary coil 107.

In order to analyse what the additional circuit element 201 should do, we may briefly recapitulate certain basic equations related to electromagnetic induction and energy. A basic formula for electromagnetic energy E is $$E = \frac{i^2 L}{2} \quad (1)$$

where i means electric current and L is inductance. On the other hand there is known a formula for the current i in an inductive component having inductance L:

$$i = \frac{Ut}{L} \quad (2)$$

in which U is the voltage across said inductive component and t is time. Using equation (2) to eliminate the symbol i from equation (1) gives $$E = \frac{U^2 t^2}{2L} \quad (3)$$

from which we may make an approximate deduction, according to which an integral over time of the voltage U is directly proportional to the energy E that was brought into the inductive component.

The efficiency of switched-mode power supplies that are made to operate with a large range of input voltages depends on both the input voltage and the output current. Efficiency is calculated as the ratio of power delivered at the output to the power drawn at the input. With very small output current values the internal losses of the switched-mode power supply, especially its primary side, become more and more significant; it may even occur that more power is consumed in internal losses than is delivered at the output. Thus, with very small output current values the switching ratio or relative width of the switching pulse (i.e. the length in time of a switching pulse in relation to the length in time of a switching cycle) becomes larger than what would be needed just to deliver the small power that will eventually be consumed at the output.

In the circuit of FIG. 2 the transformer 103 is an inductive component into which energy is brought from the primary side during a switching pulse and from which energy is drawn to the secondary side during the rest of a switching cycle according to the basic functional principle of a flyback-type switched-mode power supply. If the additional circuit element 201 contains suitable rectifier and integrator means, it will be able to produce a time integral indicative of the relative width of the switching pulse. Most advantageously an indication produced by such rectifier and integrator means is a certain DC voltage level, because it can then be very easily used as an input to comparators and/or trigger switches that give rise to predetermined action if and when said DC voltage level reaches or passes a certain threshold value. Typically an integration carried out in the additional circuit element 201 is used to produce an indication about the relative width of the switching pulse becoming larger than what would be justified by the delivered output current, which means that the output current of the switched-mode power supply is low and energy accumulates to the secondary.

Figure 3:
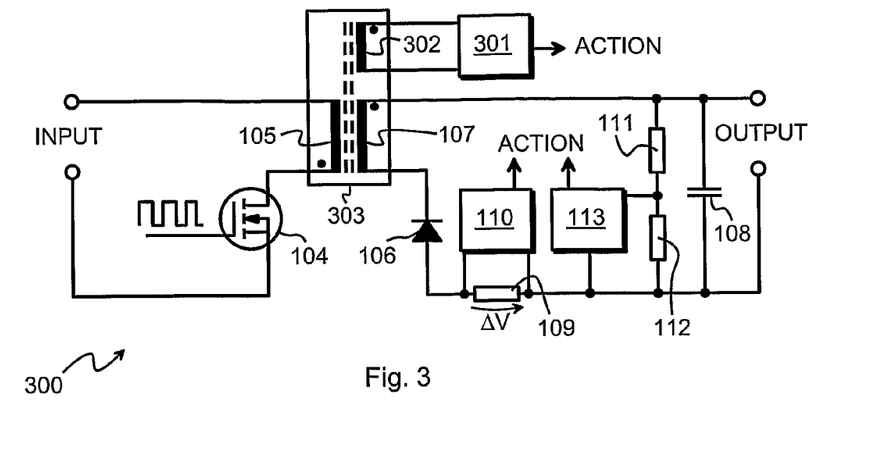
FIG. 3 illustrates a circuit principle according to another embodiment of the invention.
Figure 4:
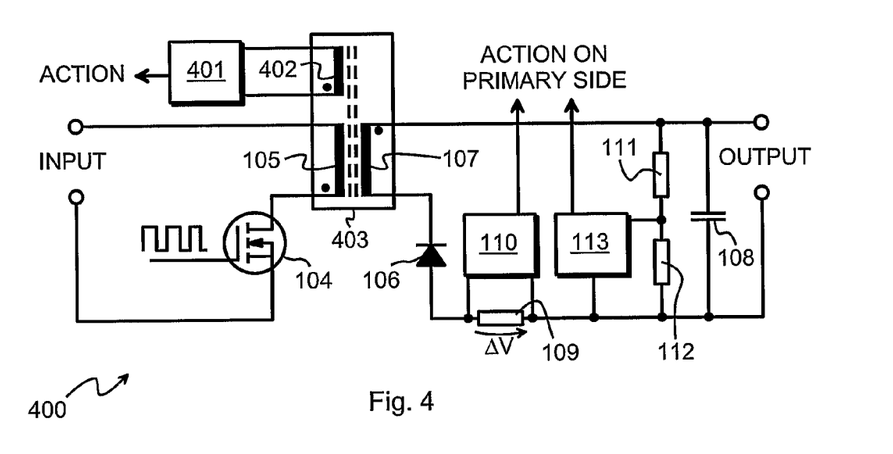
FIG. 4 illustrates a circuit principle according to another embodiment of the invention.

FIG. 3 illustrates an alternative embodiment. Here a switched-mode power supply 300 is otherwise similar to that of FIG. 1, but the transformer 303 comprises an auxiliary coil 302 which is coupled to an additional circuit element 301 located on the secondary side. Taken that the inductive coupling between the coils 105, 107 and 302 in the transformer 303 is sufficiently strong (as it usually is with transformer types commonly used in switched-mode power supplies), the electromagnetic behaviour of an auxiliary coil 302 mimics closely that of the secondary coil 107. Thus rectifying and integrating the voltage between the poles of the auxiliary coil 302 will result in an indication that is very much similar to that produced in the embodiment of FIG. 2 with the additional circuit element 201.

The invention is not limited to implementing the energy status monitoring functionality on the secondary side. Especially in so-called primary controlled power supply types it may prove advantageous to apply the principle illustrated in FIG. 4. In the switched-mode power supply 400 of FIG. 4 the trans-former 403 comprises an auxiliary coil 402 which is coupled to an additional circuit element 401 located on the primary side. Rectifying and integrating the voltage between the poles of the auxiliary coil 402 will again result in an indication that is very much similar to that produced in the embodiment of FIG. 2 with the additional circuit element 201, or that produced in the embodiment of FIG. 3 with the additional circuit element 301. We also assume that the monitoring circuits 110 and 113 are adapted to deliver their action-triggering indications to the primary side, for example through an optocoupler (not shown in FIG. 4).

Figure 5:
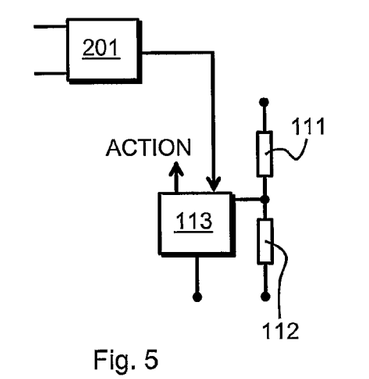
FIG. 5 illustrates an exemplary connection applicable in the embodiment of FIGS. 2 and 3
Figure 6:
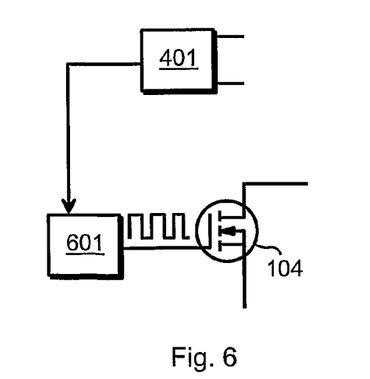
FIG. 6 illustrates an exemplary connection applicable in the embodiment of FIG. 4.

FIGS. 5 and 6 illustrate certain advantageous principles of utilising an indication about an gratuitously large pulse width produced in an additional circuit element. In FIG. 5 we assume that secondary side control is applied, like in the embodiments shown in FIGS. 2 and 3. The additional circuit element 201 is coupled to a coil (not shown in FIG. 5) in a transformer and adapted to rectify and integrate the voltage between the poles of that coil. The additional circuit element 201 is also coupled to a monitoring circuit 113, which by nature is an output voltage limiter of the switched-mode power supply in question. The coupling between the additional circuit element 201 and the monitoring circuit 113 is such that when a produced indication about a certain gratuitously large pulse width is delivered from the additional circuit element 201 to the monitoring circuit 113, the latter will react by changing its operation by a predetermined way, for example by changing the nature of the voltage comparison that will be the ultimate cause of output voltage limiting action.

Also in FIG. 6 the additional circuit element 401 is coupled to a coil (not shown in FIG. 6) in a transformer and adapted to rectify and integrate the voltage between the poles of that coil. The additional circuit element 401 is coupled to a switching pulse generating circuit 601, the task of which is to formulate and deliver switching pulses to the main primary switching element 104 of the switched-mode power supply in question. When an indication about certain gratuitously large pulse width is delivered from the additional circuit element 401 to the switching pulse generating circuit 601, the latter will react by changing its operation by a predetermined way, for example by decreasing the duty cycle of the switching pulses by a certain percentage.

Figure 7:
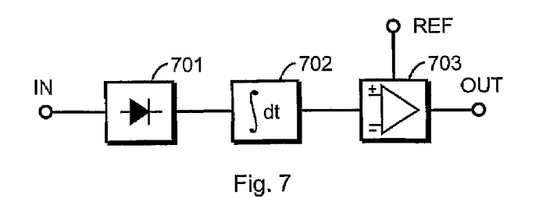
FIG. 7 illustrates a functional principle of a circuit according to an embodiment of the invention.

FIG. 7 illustrates schematically an exemplary constitution of what could be used as any of the additional circuit elements 201, 301 or 401 described above. Coupled in series between an input and an output are a rectifier 701, an integrator 702 and a comparator and/or switch 703, which is also coupled to receive a reference signal to which the output of the integrator 702 is to be compared. The integrator 702 should be understood as integrating over a certain time window; in order to focus the relative switching pulse width monitoring to a certain limited duration of most recently passed time there should be a depletion route through which the oldest contributions to the integration result are gradually erased. More generally we may characterise the integrator 702 as a circuit element adapted to collect information about a voltage signal comparable to the relative switching pulse width over a period of time that is considerably longer than the switching cycle of the primary switch.

Figure 8:
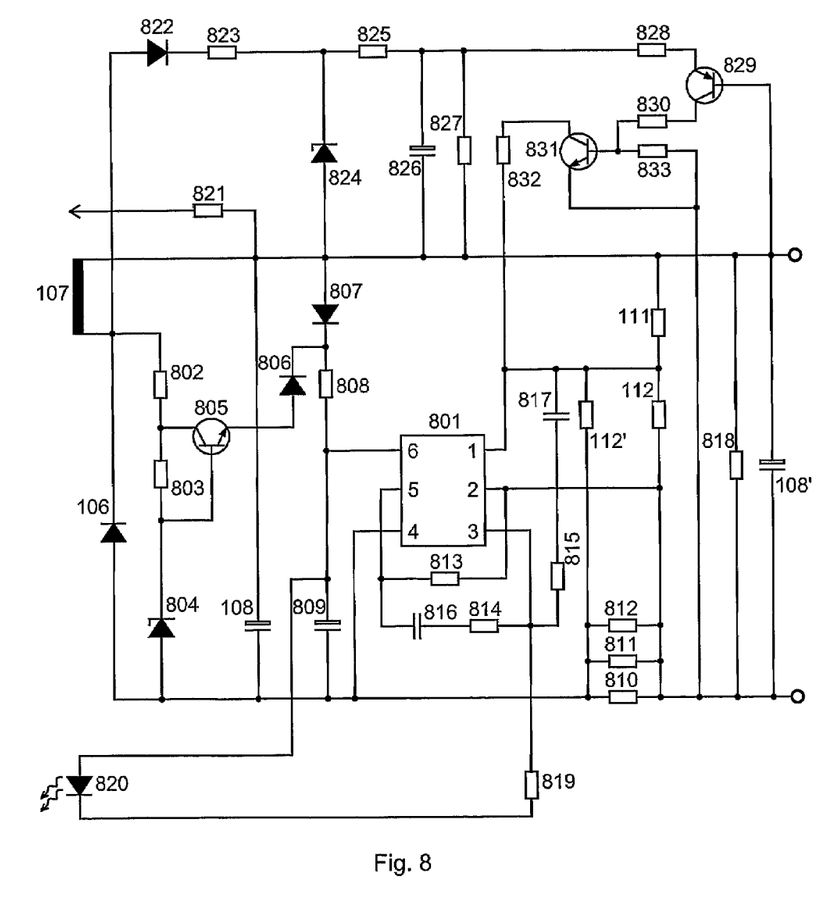
FIG. 8 illustrates an exemplary circuit according to an embodiment of the invention.

FIG. 8 is a detailed circuit diagram of the secondary side of a switched-mode power supply where the principle of the invention is applied in the form that was schematically shown previously in FIGS. 2 and 5. Familiar secondary side components are the secondary coil 107, the secondary main diode 106, the capacitors 108 and 108' as well as the voltage division resistors 111, 112 and 112'. Monitoring and control functions are built around a controller circuit 801, which as a non-limiting example may be a known secondary side controller circuit commercially available from ST Microelectronics Corporation by the code TSM1051. Its six connection pins are 1: voltage control input, 2: ground, 3: optocoupler output, 4: current control input, 5: level setting input and 6: operating voltage. Resistors 802, 803 and 808, zener diode 804, transistor 805, diodes 806 and 807 as well as capacitor 809 produce an operating voltage to pin 6 of the controller 801. The current sensing resistance consists of the parallel coupling of resistors 810, 811 and 812.

Resistors 813, 814 and 815 as well as capacitors 816 and 817 tune the sensitivity of output voltage and output current control to a suitable level. Resistor 818 is a so-called artificial load. Resistor 819 and photodiode 820 (which is a part of an optocoupler) together constitute the feedback signal route to the primary side (not shown). Resistor 821 is a shunt resistor en route to a spark discharge gap.

The upper side of the circuit diagram in FIG. 8 corresponds to the additional circuit element 201 of FIGS. 2 and 5. The anode of a diode 822 is coupled to the lower pole of the secondary coil 107 (that pole to which also the cathode of the secondary main diode 106 is coupled). Between the cathode of the diode 822 and the emitter of a PNP transistor 829 there is the series coupling of three resistors 823, 825 and 828. From between resistors 823 and 825 there is a connection to the cathode of zener diode 824, the anode of which is coupled to the positive output voltage line of the switched-mode power supply. From between resistors 825 and 828 there are connections to said positive voltage line both through capacitor 826 and through resistor 827 coupled in parallel therewith. The base of the PNP transistor 829 is also coupled to said positive voltage line.

From the collector of the PNP transistor 829 there is a series connection of resistors 830 and 833 to the negative output voltage line of the switched-mode power supply. The point between said resistors 830 and 833 is coupled to the base of an NPN transistor 831. The collector of said NPN transistor 831 is coupled through resistor 832 to the voltage control input pin of the controller 801. The emitter of said NPN transistor 831 is coupled to the negative output voltage line.

Of the components listed above, the task of the diode 822 is to rectify the voltage across the secondary coil 107. The resistor 823 and the zener diode 824 implement a pulse height limiter, which limits the height of the pulses to be integrated to a certain fixed level, so that the integration will be a mere time integral and not an integral of some pulsating voltage with variable pulse height. Resistor 825 and capacitor 826 constitute an RC integrator, so that the time constant of integration in the circuit of FIG. 8 depends on their dimensioning. The discharging or depleting time constant depends on the dimensioning of resistors 827 and 828.

During normal operation of the switched-mode power supply the switching arrangement consisting of transistors 829 and 831 and the associated resistors remains open, which means that the voltage sensed by the voltage control input pin of the controller 801 depends only on the output voltage of the power supply and the values of resistors 111, 112 and 112'. However, when the output current becomes very low, the incomplete depletion of energy from the transformer's magnetic field as well as the increase in switching pulse width due to internal losses cause the emitter potential of transistor 829 to increase. After it has reached a certain threshold value, transistor 829 becomes conductive, which turns on also transistor 831, so that a new current route is established between the voltage control input pin of the controller 801 and the negative output voltage line through resistor 832 and transistor 831. If now the resistance value of resistor 832 is small enough, the voltage drop across this new current route is smaller than what the controller 801 used to see during normal operation. This way the controller 801 is "cheated" to allow the output voltage to rise slightly higher at small output currents than without the additional current route.

Figure 9:
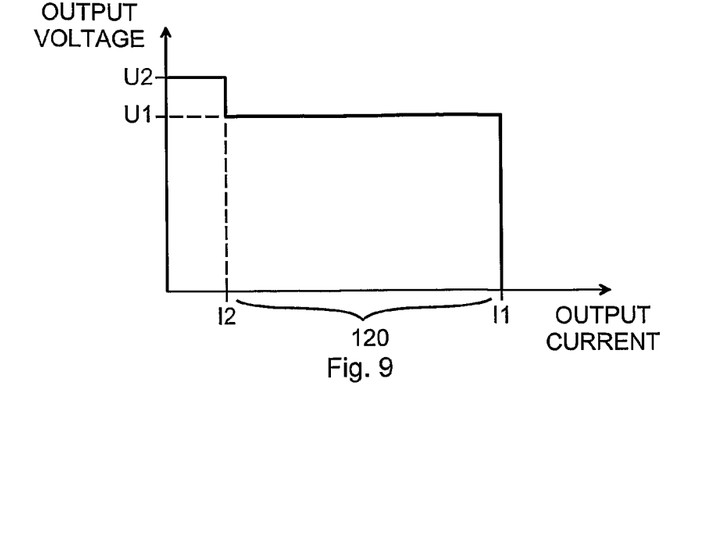
FIG. 9 is a schematic output voltage per output current diagram of a switched-mode power supply the secondary of which is built according to FIG. 8.

FIG. 9 illustrates schematically what happens in the output voltage per output current diagram. With output current values in the range approximately designated as 120, i.e. smaller than the maximum allowed value I1 but larger than a certain lower threshold value I2, the output voltage is U1 like in the prior art switched-mode power supply of FIG. 1a. With output current values between zero and I2, the additional circuit element according to the present invention steps in to cheat the output voltage controlling functionality, for which reason the output voltage assumes a slightly higher value U2.

Figure 10:
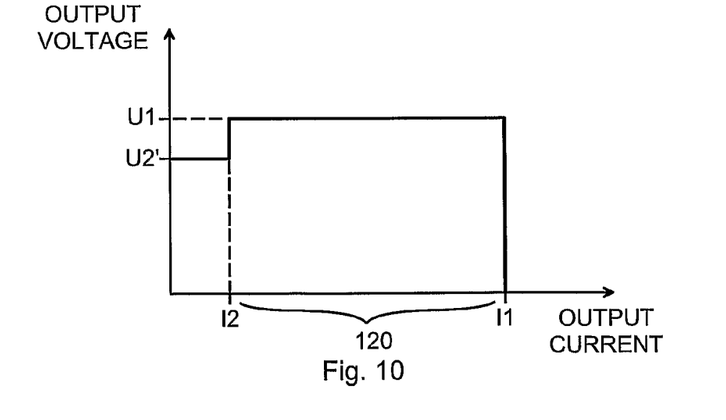
FIG. 10 is an alternative schematic output voltage per output current diagram of a switched-mode power supply the secondary of which would be slightly modified from that of FIG. 8.

The invention does not require the reaction to low output current to be exactly that described above in association with FIGS. 8 and 9, i.e. cheating the voltage control arrangement to allow a higher output voltage by creating another current path between a sensing pin and ground. A very easily implemented alternative embodiment is such where the "additional circuit element" keeps a similar current path normally in a conductive state, and blocks it when the triggering condition indicating low output current is fulfilled. As a result, the resistance observed between the appropriate sensing pin of the controller and ground will increase at low output current, which causes the controller to only allow a lower output voltage. FIG. 10 illustrates a corresponding output voltage per output current diagram, in which at output currents lower than I2 the output voltage assumes a value U2', which is lower than the nominal output voltage U1 of the switched-mode power supply.

Taken that in many electronic devices there is a clear trend towards integrating all control functionalities into compact packages, we may note that it would be relatively easy to combine the components 822 to 831 and 833 in FIG. 8 with the secondary side controller circuit 801 into a single integrated circuit. Compared to the six-pin configuration of the controller circuit 801 such a combined circuit could have e.g. a seventh pin coupled directly to the secondary coil (like the anode of diode 822 in FIG. 8), an eighth pin coupled the positive output pole (like the base of transistor 829 in FIG. 8) and a ninth pin, so that resistor 832 could be coupled between said ninth pin and the negative output pole.

Figure 11:
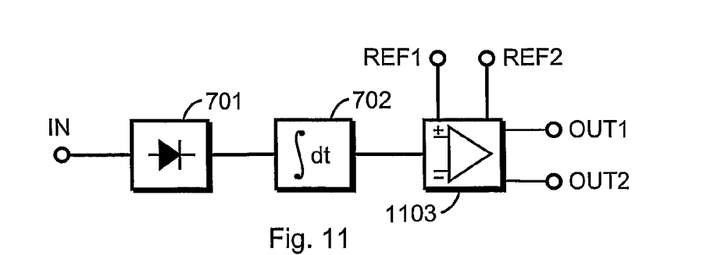
FIG. 11 illustrates a modification to the functional principle of FIG. 7.

FIG. 11 illustrates a modification to the "additional circuit element" concept that allows even more versatile application of the invention. In the circuit of FIG. 11 the rectifier 701 and integrator 702 may be similar to those used in FIG. 7. However, the comparator and/or switch 1103 is adapted to receive two different reference voltages REF1 and REF2 (of which REF1<REF2), and to give two output signals OUT1 and OUT2. The idea is that the comparator and/or switch 1103 compares the output of the integrator 702 to the two reference voltages, and indicates with its two output signals whether the output of the integrator 702 is larger than the reference voltage REF2, between the reference voltages REF1 and REF2 or smaller than reference voltage REF1. In other words, when coupled to the secondary coil or other inductive element closely coupled to the transformer, the circuit of FIG. 11 is capable of indicating, whether the output current is within normal range, within a first lower range or within a second lower range that is even lower than said first lower range.

Figure 12:
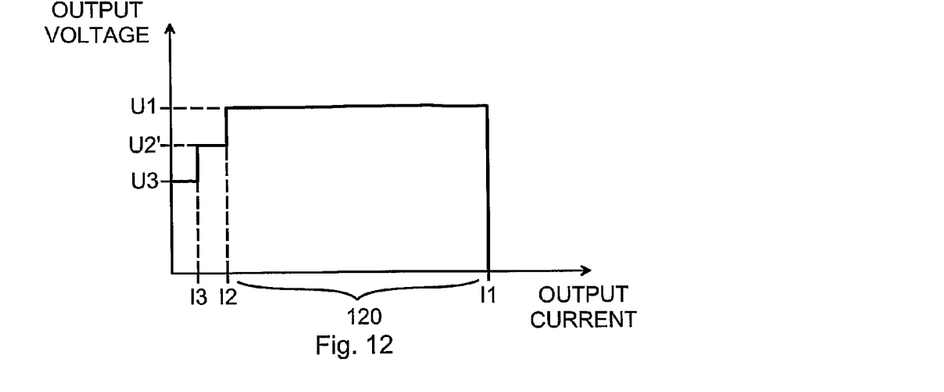
FIG. 12 is a schematic output voltage per output current diagram of a switched-mode power supply that would apply the principle shown in FIG. 11.
Figure 13:
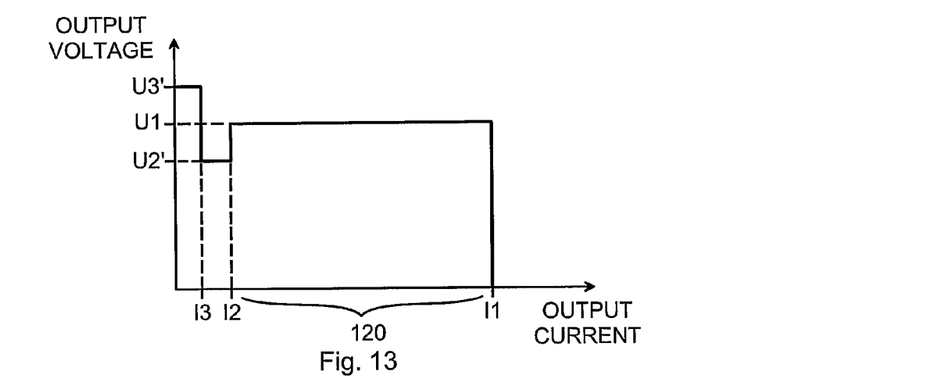
FIG. 13 is an alternative schematic output voltage per output current diagram of a switched-mode power supply that would apply the principle shown in FIG. 11.

FIGS. 12 and 13 illustrate two exemplary output voltage per output current diagrams that can be achieved by applying the principle described above in association with FIG. 11. In FIG. 12 both output current thresholds are associated with lowering the output voltage abruptly so that with output currents lower than I2 but higher than I3 the output voltage is U2', and with output currents lower than I3 the output voltage is U3. In FIG. 13 the first output current threshold that is encountered when the output current decreases is associated with a step down of the output voltage, but the next output current threshold is associated with an even larger step up of the output voltage. All kinds of combinations can be produced with differently dimensioned steps up and down.

Figure 14:
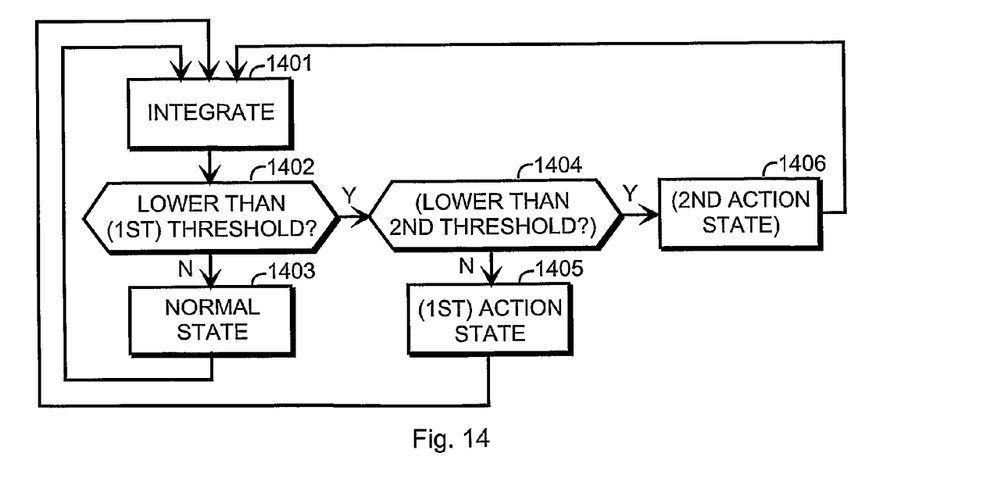
FIG. 14 is a flow diagram of a method according to an embodiment of the invention.

FIG. 14 illustrates the control method described so far schematically in the form of a flow diagram. After integrating at step 1401 there is examined at step 1402, whether the integration result indicates that the output current is lower than a (first) threshold. The use of brackets refers to the possibility that typically, in the simplest case, there will be only one threshold, and the expressions in brackets can be neglected. A negative finding at step 1402 lead to normal state at step 1403, and a return to the integration of step 1401. For the purpose of completeness there is another decision step 1404 mentioning a second threshold. If one exists, this is a real decision step and the method continues either to the first action state 1405 or to the second action state 1406 according to whether the output current is higher or lower than the second threshold respectively. In the simplest case a direct transition from a positive finding at step 1402 to step 1405 occurs. In every case integration continues from step 1401.

Figure 15:
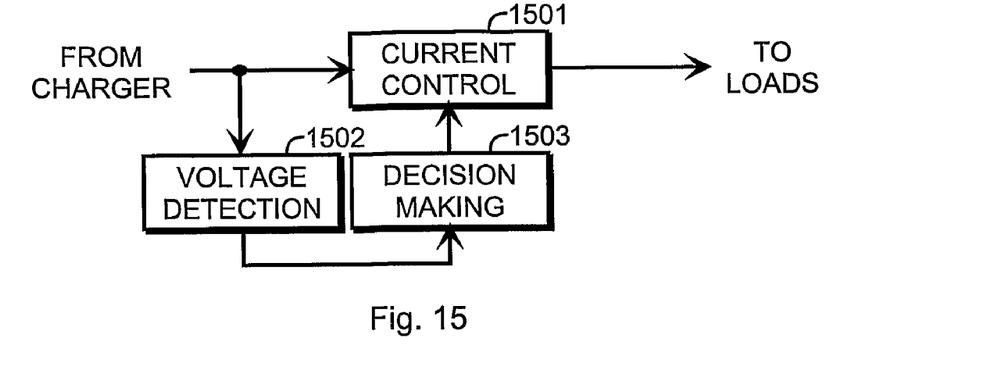
FIG. 15 illustrates certain parts of a device to be charged with a charger employing the invention.
Figure 16:
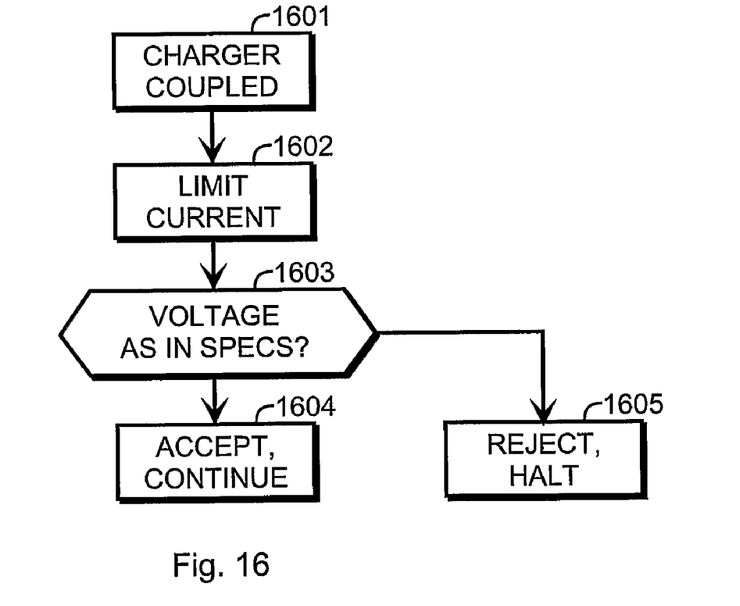
FIG. 16 is a flow diagram of an exemplary method applied in a device like that illustrated in FIG. 15.

Controllably affecting the output voltage level with small output currents allows building a number of solutions in which an intelligent device to be charged utilises the known behaviour of certain charger types to identify them before charging. FIG. 15 illustrates schematically the relevant parts of such an intelligent device to be charged. The charging current goes through a current control block 1501. Before it there is a connection to a voltage detection block 1502, which is adapted to deliver an indication about detected voltage to a decision-making block 1503. According to the method diagram of FIG. 16, when a charger has been coupled to the device at step 1601, the decision-making block 1503 commands the current control block 1501 to limit the current drawn from the charger below a certain limit as illustrated as step 1602. The voltage detection block 1502 indicates to the decision-making block 1503 how this affected the output voltage of the charger. At step 1603 the decision-making block 1503 decides, whether the detected output voltage behaviour is in accordance with what has been previously stored as the specification of output voltage behaviour of acceptable chargers. Depending on the decision, the decision-making block 1503 either allows the charging to continue according to step 1604 or forbids it according to step 1605, which last-mentioned case may include e.g. commanding the current control block 1501 to block any charging current from flowing, and indicating through a user interface that an attempt of using an unacceptable charger type has been detected and precluded.

The specific examples provided in the description given above should not be construed as limiting. For example, even if all examples discussed so far have concerned integrating the relative width (or length in time) of the switching pulse, it would be fairly easy to build an integrator that would integrate the relative width of the rest of the switching cycle instead. In the embodiment of FIG. 8 the polarity of the diode 822 is opposite to that of the main secondary diode 106, which means that the conduction periods of these diodes are complementary to each other: diode 822 conducts when diode 106 does not, and vice versa. If the polarity of the diode 822 was reversed, it would conduct simultaneously with diode 106. With certain changes to the rest of the circuitry, which changes would as such be within the capability of the person skilled in the art, it would become possible to produce a DC voltage level indicative of the relative width of the rest of the switching cycle, instead of the relative width of the switching pulse. Naturally the relative width of the rest of the switching cycle behaves in an opposite way compared to the relative width of the switching pulse, so it should be taken into account that the action-generating circuitry should be constructed to respond to a diminishing integrated voltage value, instead of an increasing integrated voltage value. Such an alternative approach might involve problems related to variable pulse height in integration, since the level of output voltage (of which the height of pulses coming to the integrator is dependent) may vary considerably e.g. in a battery charger application, where charging a completely depleted battery will start from a very low level compared to the voltage of a fully charged battery.

As another alternative embodiment it is possible to leave out the pulse height limiter from before the integrator. However, that would involve making the integration more dependent on pulse height, which may lead to inaccuracies in operation.

The invention claimed is:

1. A switched-mode power supply comprising:
   a primary side, a secondary side and a transformer between said primary side and secondary side,
   an output on the secondary side for delivering an output voltage and an output current to a load,
   an output voltage control circuit adapted to keep the output voltage at a first level, corresponding to a first output current value,
   a circuit element adapted to integrate over time a voltage obtained from the transformer and to produce a signal indicative of the integrated voltage, corresponding to a second output current value smaller than said first output current value, and
   an output voltage modifier adapted to respond to said signal by changing the output voltage from said first level to a second level.

2. A switched-mode power supply according to claim 1, further comprising a pulse height limiter adapted to limit the height of pulses in said voltage obtained from the transformer to a fixed level.

3. A switched-mode power supply according to claim 1, wherein said circuit element comprises a rectifier coupled to a secondary coil of said transformer, an integrator coupled to an output of said rectifier, and a comparator adapted to produce a signal as a response to an output voltage of said integrator reaching a threshold compared to a reference voltage.

4. A switched-mode power supply according to claim 3, wherein said output voltage control circuit is adapted to monitor a voltage over a resistor, and the switched-mode power supply comprises a current route alternative to said resistor as well as a switch adapted to switch on said current route as a response to said signal.

5. A switched-mode power supply according to claim 4, further comprising:
   a rectifier diode coupled by its anode to a pole of said secondary coil,
   an RC integrator coupled to the cathode of said rectifier diode,
   a PNP transistor coupled by its emitter to an output of said RC integrator and by its base to a positive output pole of the switched-mode power supply,
   an NPN transistor coupled by its base to the collector of said PNP transistor and
   a coupling from a voltage control input pin of said output voltage control circuit through a resistor and the collector-emitter path through said NPN transistor to a negative output pole of the switched-mode power supply.

6. A switched-mode power supply according to claim 1, wherein said circuit element comprises a rectifier coupled to an auxiliary coil of said transformer, an integrator coupled to an output of said rectifier and a comparator adapted to produce a signal as a response to an output voltage of said integrator reaching a certain threshold compared to a reference voltage.

7. A switched-mode power supply according to claim 6, wherein said comparator is adapted to deliver said signal to a control circuit on the secondary side of said switched-mode power supply.

8. A switched-mode power supply according to claim 6, wherein said comparator is adapted to deliver said signal to a control circuit on the primary side of said switched-mode power supply.

9. A control circuit for controlling the output voltage of a switched-mode power supply, said control circuit being adapted to keep the output voltage at a first level, corresponding to a first output current value of said switched-mode power supply comprising:
   a circuit element adapted to integrate over time a voltage obtained from a transformer between a primary side and a secondary side of said switched-mode power supply and to produce a signal indicative of the integrated voltage, corresponding to a second output current value smaller than said first output current value, and an output voltage modifier adapted to respond to said signal by changing the output voltage from said first level to a second level.

10. A method for controlling the output voltage of a switched-mode power supply, comprising:

monitoring a voltage drop over a current sensing resistor coupled to conduct an output current of said switched-mode power supply, and invoking limiting action as a response to said voltage drop growing larger than an output current related limit, monitoring a sample voltage taken from an output voltage of said switched-mode power supply, and invoking limiting action as a response to said sample voltage growing larger than an output voltage related limit, integrating over time a voltage obtained from a transformer between a primary side and a secondary side of said switched-mode power supply, producing a signal indicative of the integrated voltage, corresponding to an output current value smaller than said output current related limit, and responding to said signal by changing the output voltage from a first regulated level to a second regulated level.

11. A method according to claim 10, further comprising limiting the height of pulses in said voltage obtained from the transformer to a fixed level before integration.

12. A method according to claim 10, further comprising:

producing a first signal indicative of the integrated voltage, corresponding to a first output current value smaller than said output current related limit, responding to said first signal by changing the output voltage to a first value, producing a second signal indicative of the integrated voltage, corresponding to a second output current value smaller than said first output current value, and responding to said second signal by changing the output voltage to a second value.

* * * * *